United States Patent
Niquette

(10) Patent No.: US 12,433,284 B2
(45) Date of Patent: Oct. 7, 2025

(54) DYNAMIC PEST CONTROL FOAM GENERATION AND INJECTION

(71) Applicant: Damian Niquette, Georgetown, TX (US)

(72) Inventor: Damian Niquette, Georgetown, TX (US)

(73) Assignee: EVOFOAM PEST CONTROL LLC, Escanaba, MI (US)

( * ) Notice: Subject to any disclaimer, the term of this patent is extended or adjusted under 35 U.S.C. 154(b) by 0 days.

(21) Appl. No.: 18/888,795

(22) Filed: Sep. 18, 2024

(65) Prior Publication Data

US 2025/0107517 A1    Apr. 3, 2025

Related U.S. Application Data

(60) Provisional application No. 63/586,944, filed on Sep. 29, 2023.

(51) Int. Cl.
   *A01M 7/00*    (2006.01)
(52) U.S. Cl.
   CPC .................. *A01M 7/0032* (2013.01)
(58) Field of Classification Search
   CPC .................................................. A01M 7/0032
   See application file for complete search history.

(56) References Cited

U.S. PATENT DOCUMENTS

| 4,165,834 A * | 8/1979 | Pitchon | A01B 69/022 |
| | | | 239/10 |
| 4,822,613 A | 4/1989 | Rodero | |
| 5,346,699 A | 9/1994 | Tiernan et al. | |

(Continued)

FOREIGN PATENT DOCUMENTS

| EP | 3238833 A1 | 11/2017 |
| JP | S63197563 A | 8/1988 |

(Continued)

OTHER PUBLICATIONS

"B&G Versafoamer HH 1 Gallon Foamer," DoMyOwn.com. Accessed Sep. 18, 2024, 5 pages.

(Continued)

*Primary Examiner* — Christopher P Ellis
(74) *Attorney, Agent, or Firm* — Thompson Patent Law Offices PC

(57) ABSTRACT

Apparatus and associated methods relate to a topical pests control application system (PCAS). In an illustrative example, the PCAS includes a foam generation unit (FGU) receiving a mixture of an active ingredient and a solvent (e.g., water). For example, the FGU may generate a pest controlling foam at a foam generating orifice having an input aperture and an output aperture. For example, the FGU may generate a mixture of the active ingredient and the solvent. For example, the input aperture and the output aperture may be selected as a function of a hose length connected to the PCAS, the active ingredient, the input flow rate, and a predetermined pressure drop between the input aperture and the output aperture. Various embodiments may advantageously generate the pest controlling foam with a minimum dwell time of at least 5 minutes posterior to application on a surface.

20 Claims, 10 Drawing Sheets

(56) References Cited

U.S. PATENT DOCUMENTS

| | | | |
|---|---|---|---|
| 6,155,351 A * | 12/2000 | Breedlove | A62C 5/02 |
| | | | 169/85 |
| 8,673,088 B1 | 3/2014 | Suiter, II | |
| 2004/0123991 A1 | 7/2004 | Hanratty | |
| 2007/0173980 A1 | 7/2007 | Lovett et al. | |
| 2007/0249273 A1 * | 10/2007 | Francis | A22B 3/086 |
| | | | 452/66 |
| 2014/0026481 A1 | 1/2014 | Podmajersky | |
| 2018/0359909 A1 * | 12/2018 | Conrad | A01M 7/005 |
| 2020/0355541 A1 | 11/2020 | McCurdy | |
| 2024/0292824 A1 * | 9/2024 | Majher | A01M 7/0003 |

FOREIGN PATENT DOCUMENTS

| | | | | |
|---|---|---|---|---|
| JP | S63214131 A | | 9/1988 | |
| JP | 2006188465 A * | | 7/2006 | |
| TW | 1574619 B | | 3/2017 | |
| WO | WO-2011092141 A2 * | | 8/2011 | A01N 43/76 |
| WO | 2016082000 A1 | | 6/2016 | |
| WO | WO-2022154653 A1 * | | 7/2022 | |

OTHER PUBLICATIONS

"Chemical Injectors—PowerWash.com." Accessed: Sep. 18, 2024, 9 pages.

"Pressure Washer Foamers & Sprayers—Frequently Asked Questions—Lafferty Learning Center." Assessed Sep. 18, 2024, 5 pages.

"Sure Shot Sure-Fil System (For Model-A and Model-M Sprayers) | Momar—Solutions for the World Since 1947." Assessed Sep. 18, 2024, 12 pages.

* cited by examiner

DYNAMIC PEST CONTROL FOAM GENERATION AND INJECTION

CROSS-REFERENCE TO RELATED APPLICATIONS

This application claims the benefit of U.S. Provisional Application Ser. No. 63/586,944, titled "DYNAMIC PEST CONTROL FOAM GENERATION AND INJECTION," filed by Damian Niquette, on Sep. 29, 2023.

TECHNICAL FIELD

Various embodiments relate generally to pest control application using a foam.

BACKGROUND

Pest control has been an essential practice throughout human history, addressing the need to protect crops, structures, and public health from the damage and disease caused by unwanted organisms. For example, various pest control methods may be used. For example, some people may use physical traps and barriers to prevent the entry of pests. In some examples, some people may deploy repellents (e.g., natural repellents). Chemical pesticides in the modern days, in some examples, may revolutionize the pest control industry by offering an efficient way of controlling a wide array of pests.

Chemical pesticides, for example, may include substances specifically designed to kill, repel, or control pests (e.g., insects, weeds, fungi, rodents). The chemical pesticides may be classified into several categories based on their chemical composition and their target organisms. For example, one class of chemical pesticides may include organophosphates. For example, the organophosphates may target the nervous system of insects. For example, pyrethroids, synthetic chemicals modeled after natural pyrethrins found in chrysanthemums, may be used for their rapid knockdown effect on insects. Some pesticides may include carbamates that may target a nervous system of pests. In some examples, the chemical pesticides may include herbicides (e.g., glyphosate) to target plant pests. For example, fungicides may be used to prevent the growth of fungi.

SUMMARY

Apparatus and associated methods relate to a topical pests control application system (PCAS). In an illustrative example, the PCAS includes a foam generation unit (FGU) receiving a mixture of an active ingredient and a solvent (e.g., water). For example, the FGU may generate a pest controlling foam at a foam generating orifice having an input aperture and an output aperture. For example, the FGU may generate a mixture of the active ingredient and the solvent. For example, the input aperture and the output aperture may be selected as a function of a hose length connected to the PCAS, the active ingredient, the input flow rate, and a predetermined pressure drop between the input aperture and the output aperture. Various embodiments may advantageously generate the pest controlling foam with a minimum dwell time of at least 5 minutes posterior to application on a surface.

Apparatus and associated methods relate to a dynamic pest control foam generation and injection system and method. In an illustrative example, a variable speed pressure washer (VSPW) may be fluidly coupled to a solvent (e.g., water) reservoir. An output of the VSPW may, for example, be fluidly coupled to a solute injection system. The solute injection system may also be fluidly coupled to a solute reservoir. The solute reservoir may, for example, include one or more pest control active ingredients (e.g., insecticides, cleaners, essential oils). An output of the solute injection system may be fluidly coupled to a foaming dispensing tip. The foaming dispensing tip may, for example, foam the solution of the solvent and the solute to generate and dispense a foam solution. Various embodiments may advantageously apply pest control ingredients (e.g., insecticides, essential oils) to buildings to reduce or prevent pest (e.g., insect, bug) infestations.

Various embodiments may achieve one or more advantages. For example, some embodiments may advantageously cause the solute injection system to automatically activate metered injection of the solute into a solvent fluid stream at a predetermined concentration. Some embodiments may, for example, advantageously conserve water by expanding water by 3-6 times by volume to reduce water used for application of the active ingredient to control pests. For example, some embodiments may advantageously prevent the pest control foam generated from collapsing. For example, some embodiments may advantageously clean targeted features (e.g., trash cans, pavements, driveways) of the exterior of a house. Some embodiments, for example, may advantageously increase running time of the PCAS. For example, some embodiments may improve an effectiveness and efficiency of the PCAS.

For example, some embodiments may include a surfactant to dissolve chitin on insects to advantageously increase insect uptake of the active ingredient (e.g., insecticide, essential oils).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a pest control foam generation system is introduced with reference to FIGS. 1A-1B. Second, that introduction leads into a description with reference to FIGS. 2A-5 of some exemplary embodiments of a pest control foam generation configuration generator. Third, with reference to FIGS. 6-7, this document describes exemplary apparatus and methods useful for operating and configuring the pest control foam generation system. Finally, the document discusses further embodiments, exemplary applications and aspects relating to the pest control foam generation system.

Figure 1A:
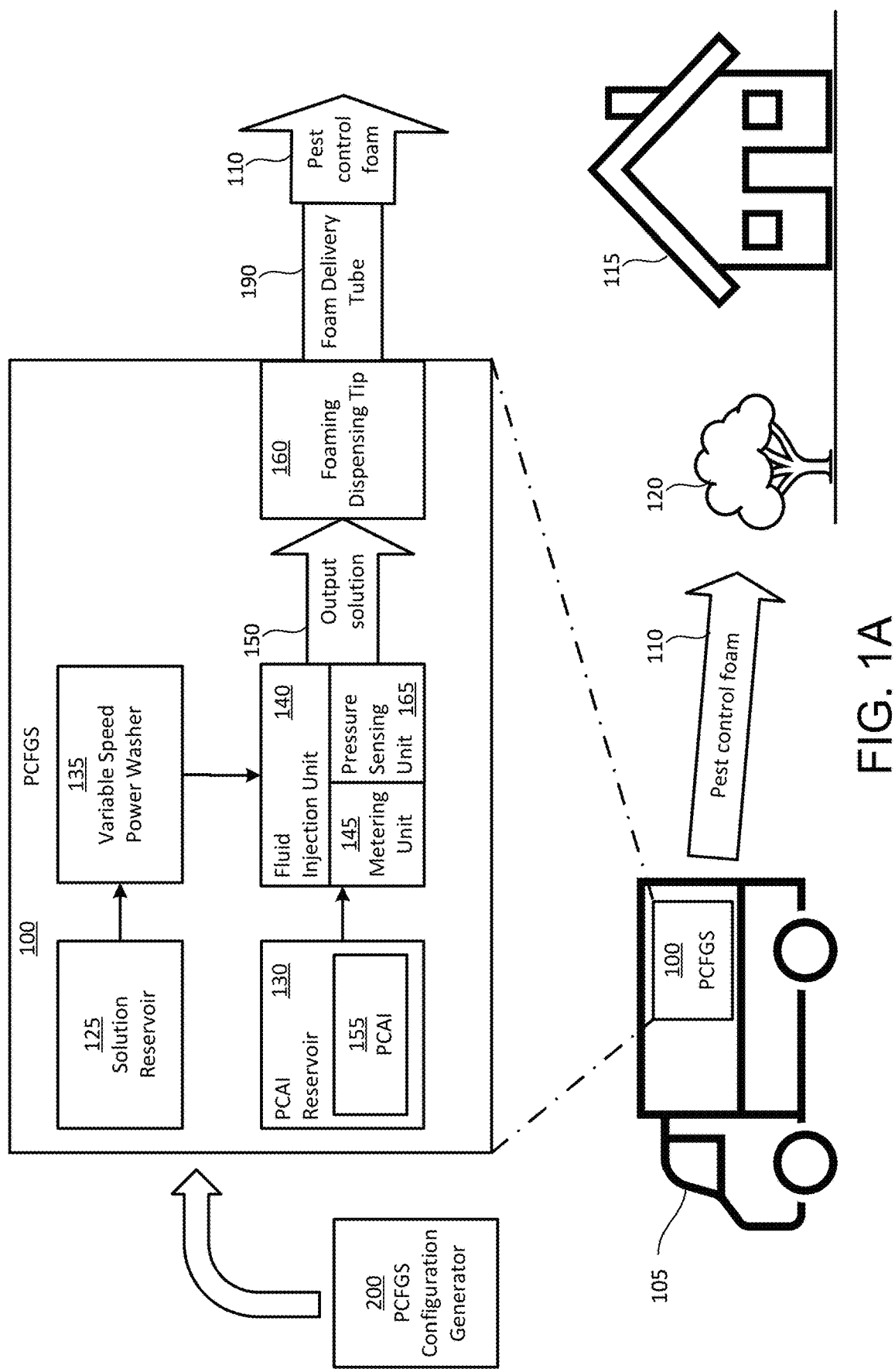
FIG. 1A, FIG. 1B, and FIG. 1C depict an exemplary pest control foam generation system (PCFGS) employed in an illustrative use-case scenario.
Figure 1B:
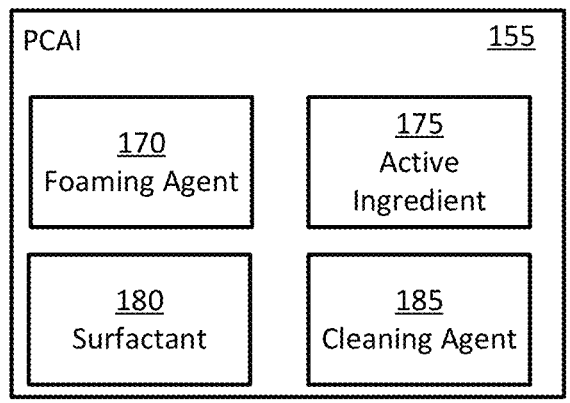
Figure 1C:
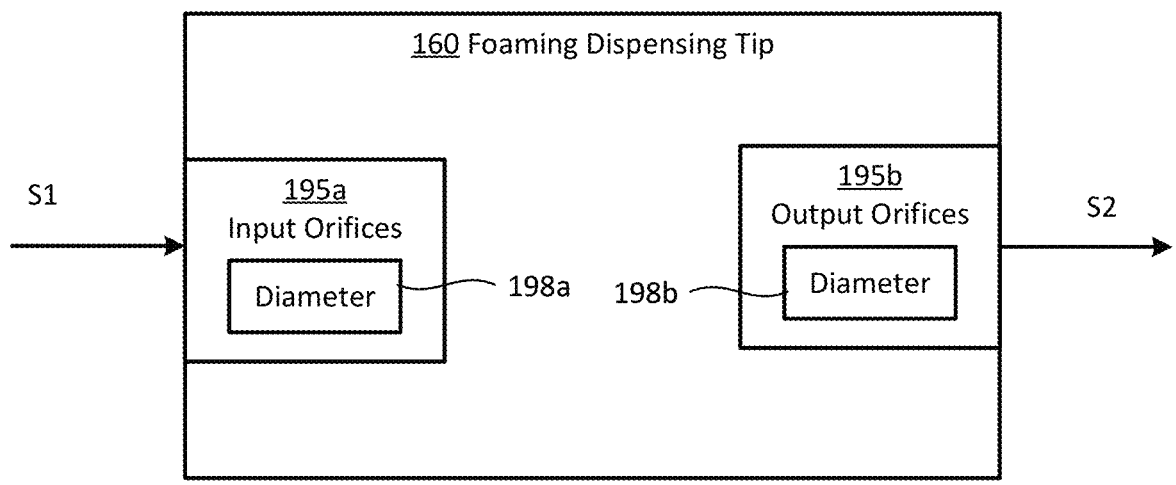

FIG. 1A, FIG. 1B, and FIG. 1C depict an exemplary pest control foam generation system (PCFGS) employed in an illustrative use-case scenario. As shown in FIG. 1A, a PCFGS 100 is a portable system fitted in a vehicle 105 (e.g., a truck, a van, a passenger car). In this example, the PCFGS 100 generates a pest control foam 110. For example, the pest control foam 110 may be applied to an external of a house 115 (e.g., homes, offices, warehouses, industrial complexes, hospitals, food preparation facilities). For example, the pest control foam 110 may be applied to a wall of a house. For example, the pest control foam 110 may also be applied to a garden area 120 of the house 115. In some implementations, the pest control foam 110 may be topically applied to fixtures and/or furniture in the garden area 120.

As shown, the PCFGS 100 includes a solution reservoir 125 and a pest control active ingredient reservoir (PCAI reservoir 130). For example, the solution reservoir 125 may include a water reservoir. For example, the solution reservoir 125 may be a (e.g., vertical) water tank. In various embodiments, the solution reservoir 125 may store acid controlled solution. For example, the water stored in the solution reservoir 125 may be slightly acidic (e.g., with pH value of 5, 6-6.5, 7). For example, the water stored in the solution reservoir may have a pH value of more than 7. For example, a required pH value of the solvent in the solution reservoir may be determined based on location and climate at the location at the time of applying the pest control foam 110. In some implementations, the water may undergo an acid regulation process before being stored in the solution reservoir 125.

The solution reservoir 125 is fluidly coupled to a variable speed pressurization and dispensing unit (VSPDS 135). For example, the VSPDS 135 may include a variable speed pressure washer. For example, the VSPDS 135 may include a constant pressure pump. For example, the VSPDS 135 may include a variable speed pump. An output of the VSPDS 135 may be fluidly coupled to a fluid injection unit 140. The fluid injection unit 140 may, in this example, be fluidly coupled to the PCAI reservoir 130 via a metering unit 145 (e.g., including a metering tip). In some implementations, the fluid injection unit 140 may mix input fluid from the solution reservoir 125 and the PCAI reservoir 130 to generate an output solution 150.

In this example, the fluid injection unit 140 generates an output solution 150 using fluids received from the PCAI reservoir 130 and the solution reservoir 125 via the VSPDS 135. As shown, the PCAI reservoir 130 includes PCAI 155 (e.g., insecticides, cleaners, essential oils). For example, the PCAI 155 may be a sustainable chemical. For example, the PCAI 155 may include environmentally friendly materials. Various embodiments of the PCAI 155 are described with reference to FIG. 1B.

The fluid injection unit 140 is, as shown, fluidly coupled to a foaming dispensing tip 160. For example, the fluid injection unit 140 may be coupled to the foaming dispensing tip 160 using a (hydraulic) hose suspended to an electric hose reel. For example, the PCFGS 100 may include power to inject the output solution 150 over an at least 300 feet long hose. For example, the foaming dispensing tip 160 may include an air injection nozzle. For example, the foaming dispensing tip 160 may include a flat spray nozzle.

In some implementations, the fluid injection unit 140 may operate to regulate an (user-selected) output pressure. For example, the fluid injection unit 140 may fluidly communicate with the VSPDS 135 to maintain an output pressure of the output solution 150. For example, the fluid injection unit 140 may adjust a speed of the VSPDS 135 based on a predetermined output pressure.

In some implementations, the metering unit 145 may be calibrated based on properties of a pest control target (e.g., the house 115). For example, the metering unit 145 may be configured to generate the output solution 150 with a predetermined concentration of the PCAI 155. For example, the metering unit 145 may be configured (e.g., calibrated, metering tip selected) as a function of the predetermined concentration (e.g., concentration per area) based on the pest control target. As an illustrative example without limitation, if the pest control target includes a treatment area of 1,000 square feet, the predetermined concentration may be 1 of the PCAI 155 per gallon of solution in the solution reservoir 125. In some examples, the predetermined concentration may be restricted by various external requirements and a composition of the PCAI 155 (e.g., legal requirements to prevent excessive toxic insecticides disposed in an open environment).

In some implementations, the metering unit 145 may include a total output threshold. For example, the total output threshold may be a user selected threshold of a maximum amount of the PCAI 155 being used in a pest control action. As an illustrative example, a user may select, for an average treatment of a 5 foot band around the house 115, a maximum of 1 gallon of the PCAI 155 to be used. In some examples, the total output threshold may be determined based on features around the pest control target. For example, the total output threshold may increase if insect breeding areas, road trees, trash cans, recycle bins, or a combination thereof, are present in the pest control target. For example, the total output threshold may be determined based on a total volume per area (e.g., determined as a target concentration per area treated).

The foaming dispensing tip 160 may, for example, foam the output solution 150 to generate and dispense the pest control foam 110. The pest control foam 110 may, for example, be applied around a building (e.g., a house, a yard). The pest control foam 110 may, for example, suffocate target insects. In some implementations, the foaming dispensing tip 160 may be interchangeable. For example, a diameter of the foaming dispensing tip 160 may be selected as a function of a predetermined flow rate (e.g., based on gallons per minute per unit area). For example, a diameter of the foaming dispensing tip 160 may be selected as a function of a predetermined pressure output (e.g., measured in pound per square inch (PSI)). A diameter of the foaming dispensing tip 160 may, for example, be selected as a function of a pressure drop (e.g., maximum permissible pressure drop, target minimum pressure drop). The pressure drop may, for example, be determined as a function of the injection unit (e.g., as a function of flow and pressure).

In operation, the foaming dispensing tip 160 may, for example, induce a predetermined pressure drop. As shown, the fluid injection unit 140 includes a pressure sensing unit (PSU 165). For example, the PSU 165 may detect a pressure drop (e.g., a PSI drop). The predetermined pressure drop may, for example, cause the fluid injection unit 140 to automatically activate the metering unit 145 to receive a metered injection of the PCAI from the PCAI reservoir 130 into a solvent fluid stream received from the VSPDS 135 at a predetermined concentration. In some implementations, upon detecting the pressure drop, the PSU 165 may automatically actuate the metering unit 145 to receive (e.g., aspirate, by inducing a pressure difference) the PCAI from the PCAI reservoir 130 to the fluid injection unit 140. Accordingly, the PCFGS 100 may advantageously generate the pest control foam 110 with an effective concentration of the PCAI 155. The pest control foam 110 may, for example, advantageously conserve water by expanding water by 3-6 times by volume, thereby reducing the amount of water used for application of active ingredients to control pests.

In the depicted example, the PCFGS 100 is connected to a proximal end of a foam delivery tube 190. For example, the foam delivery tube 190 may include a hose having a fixed length. As an illustrative example without limitation, the foam delivery tube 190 may be a hose with a fixed length of at least 100 feet. For example, the fixed length may be 300 feet. In some implementations, a pressure of the pest control foam 110 at an output end (e.g., a distal end) of the foam delivery tube 190 may decrease as a function of the fixed length. For example, the predetermined pressure drop may be determined based on the fixed length coupled to the PCFGS 100.

In the depicted example, a PCFGS configuration generator (PCG 200) may be used to generate recommended configurations of the PCFGS 100 based on the fixed length, the PCAI 155, and parameters of the house 115. For example, the PCG 200 may be configured to generate a first predetermined pressure generated by the VSPDS 135. For example, the PCG 200 may be configured to generate a predetermined flow rate between the PCAI reservoir 130 and the fluid injection unit 140. In some implementations, the PCG 200 may be configured to generate diameters of an input orifice 195a and an output orifice 195b (as further described with reference to FIG. 1C).

As shown in FIG. 1B, the PCAI 155 includes a foaming agent 170 and an active ingredient 175. The active ingredient 175, for example, may include essential oil. For example, the active ingredient 175 may include environmentally friendly (e.g., green) insecticides.

For example, the foaming agent 170 may include Sodium Lauryl Sulfate (SLS). The foaming agent 170 may reduce a surface tension of the mixture of the solution form the solution reservoir 125 and the PCAI 155. For example, the foaming agent 170 may stabilize bubbles generated in the foaming dispensing tip 160 to advantageously prevent the pest control foam 110 generated in the foaming dispensing tip 160 from collapsing.

In this example, the PCAI 155 includes a surfactant 180 (e.g., mixed in the PCAI reservoir 130 with the PCAI 155). In other examples, the surfactant 180 may be premixed in the solution stored in the solution reservoir 125. For example, the surfactant 180 may be mixed with the PCAI in the fluid injection unit 140 upon use. For example, the surfactant 180 may dissolve chitin of insects, synergistically operating with the active ingredient to increase insect uptake of the active ingredient. Various embodiments may, for example, advantageously be used to apply pest control ingredients (e.g., insecticides, essential oils) to buildings (e.g., homes, offices, warehouses, industrial complexes, hospitals, food preparation facilities) to reduce or prevent pest (e.g., insect, bug) infestations.

The PCAI 155 also includes a cleaning agent 185. For example, the cleaning agent 185 may be stored in the PCAI reservoir 130. For example, the cleaning agent 185 may be pre-mixed with the PCAI before loading into the vehicle 105. In some implementations, the cleaning agent 185 may enhance a cleaning capability of the pest control foam 110. For example, the cleaning agent 185 may advantageously clean targeted features (e.g., trash cans, pavements, driveways) of the external of the house 115.

As shown in FIG. 1C, the foaming dispensing tip 160 may include the input orifice 195a coupled to receive an output solution S1. For example, the output solution S1 may include a first predetermined pressure P1. In some examples, the output orifice 195b may be delivering an output foam S2 with a second predetermined pressure P2. In some examples, the pressure drop between P1 and P2 may be determined by a ratio of an input diameter 198a and an output diameter 198b. For example, P1 may be between 1400-1600 psi. For example, P2 may be between 750 to 1000 psi. In some embodiments, the PCG 200 may generate a recommended ratio of the input diameter 198a and the output diameter 198b based on the parameter of the house 115, the fixed length of the foam delivery tube 190, a type of the PCAI 155, a predetermined input pressure (e.g., the user-selected output pressure of the fluid injection unit 140), and/or other environmental factors. For example, the predetermined input pressure may be between 1400 psi and 1600 psi. In an illustrative example, P2 may be selected to generate an output pressure at the distal end of the foam delivery tube 190 of 60-150 psi to be applied topically to surfaces in the house 115. For example, the recommended ratio may be between 1.5 to 2.2. For example, the input orifice input orifice 195a may include a diameter of 4 inches and the output orifice 195b may include a diameter of 7.5 inches.

In some embodiments, the input orifice 195a and/or the output orifice 195b may be non-circular. For example, the input diameter 198a and/or the output diameter 198b may indicate a surface area of the input orifice 195a and/or the output orifice 195b regardless of a shape of the input orifice 195a and/or the output orifice 195b. For example, the input orifice 195a and/or the output orifice 195b may be a rectangular shape, a polygon, triangular, a square, or a combination thereof.

Figure 2A:
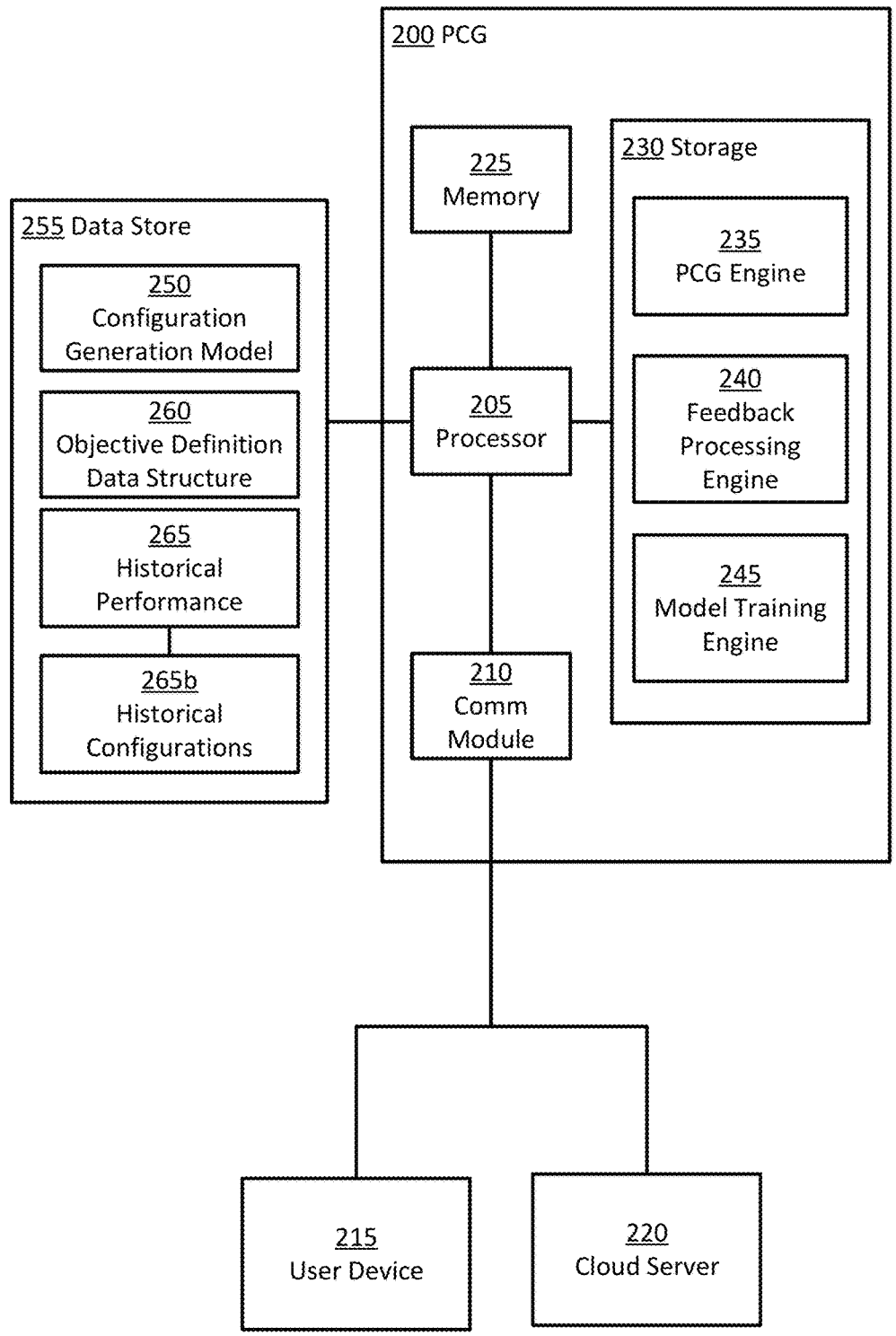
FIG. 2A and FIG. 2B are block diagrams depicting an exemplary PCFGS configuration generator.
Figure 2B:
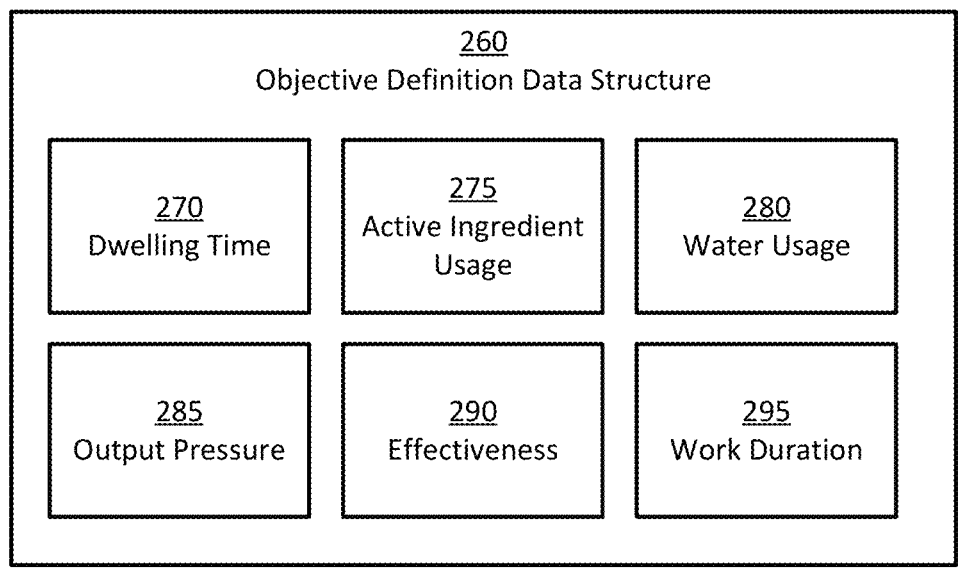

FIG. 2A and FIG. 2B are block diagrams depicting an exemplary PCFGS configuration generator. As shown in FIG. 2A, a PCG 200 (e.g., the PCG 200 as described with reference to FIG. 1A) includes a processor 205. The processor 205 may, for example, include one or more processing units. The processor 205 is operably coupled to a communication module 210. The communication module 210 may, for example, include wired communication. The communication module 210 may, for example, include wireless communication. In the depicted example, the communication module 210 is operably coupled to a user device 215 and a cloud server 220. For example, a user may input parameters to the PCG 200 using the user device 215. For example, the user may input a length of a hose to the PCG 200. For example, the user may select a type of PCAI 155 to the PCG 200. For example, the user may provide operation parameters (e.g., output pressure range) of the VSPDS 135 and the fluid injection unit 140 to the PCG 200. In some examples, the user may input an application size of the house 115 to the PCG 200.

For example, the communication module 210 may be connected to the communication module 210 through a data communication network. For example, the PCG 200 may receive information, including historical weather information, configuration of other PCFGS 100, and other external information through the cloud server 220.

The processor 205 is operably coupled to a memory module 225. The memory module 225 may, for example, include one or more memory modules (e.g., random-access memory (RAM)). The processor 205 includes a storage module 230. The storage module 230 may, for example, include one or more storage modules (e.g., non-volatile memory). In the depicted example, the storage module 230 includes a PCG engine 235, a feedback processing engine 240, and a model training engine 245. For example, the PCG engine 235 may generate a configuration profile (e.g., a data file including configuration parameters of the PCFGS 100). For example, the user device 215 may generate a user interface based on the configuration profile. In some implementations, the configuration profile may include a surface area ratio of the input orifice 195a and the output orifice 195b. For example, the PCG engine 235 may generate the configuration profile based on a user input received from the user device 215. For example, the user may input a length of the foam delivery tube 190 and the predetermined input pressure from the VSPDS 135 to the PCG 200 using the user device 215.

For example, the feedback processing engine 240 may receive feedback input from the user device 215. For example, the user device 215 may transmit a performance data associated with a pests control job. For example, the performance data may be received by the feedback processing engine 240 to be saved. In some embodiments, the performance data may include an average, minimum, and/or maximum dwell time of a generated foam. In some implementations, the performance data may include a measurement of effectiveness of the generated foam. For example, the effectiveness may be measured based on a number of weeks before another pest control job is to be performed again. In some implementations, the performance data may include consumption of water and/or active ingredients in the job.

In some implementations, the model training engine 245 may process the saved performance data to train a configuration generation model 250 in the data store 255. In this example, the processor 205 is further operably coupled to the data store 255. The data store 255 includes the configuration generation model 250, an objective definition data structure 260, and a historical performance 265.

In some implementations, the PCG engine 235 may apply input received from the user device 215 to the configuration generation model 250 to generate the configuration profile. For example, the configuration profile may be generated based on the objective definition data structure 260. For example, the objective definition data structure 260 may include a minimum dwell time of the pest control foam 110. In some examples, the minimum dwell time (e.g., of the pest control foam 110 posterior to application topically on a surface) may be predestined by the user. For example, the minimum dwell time may be more than 5 minutes. For example, the minimum dwell time may be more than 10 minutes. For example, the minimum dwell time may be more than 15 minutes. For example, the minimum dwell time may be more than 20 minutes. In various examples, the minimum dwell time may be directly proportional to the effectiveness of the PCAI 155 on a surface at the house 115.

In some implementations, the objective definition data structure 260 may include a requirement of a maximum ration of the PCAI 155 in the solution reservoir 125. For example, less concentration of the PCAI 155 may be considered more eco-friendly. For example, because some of the PCAI 155 may be toxic, the objective definition data structure 260 may include a minimum concentration (e.g., 0.003%, 0.005%, 0.01%, <0.2%).

In some implementations, the objective definition data structure 260 may include a maximum usage of a solvent (e.g., water, a alcohol based solution, a mixture solvent) in the solution reservoir 125 per area (e.g., square foot). For example, a lower usage of the solvent may mean less refilling time of the solvent for the vehicle 105. For example, the PCG 200 may advantageously increase running time of the vehicle 105.

For example, the historical performance 265 may include performance data (e.g., foam dwelling time, PCAI effectiveness measurement) associated with configuration parameters (e.g., the predetermined pressure drop, the input pressure P1, the output pressure P2, length of the foam delivery tube 190) and environmental factors (e.g., season of the year, temperature, rainfall data). In some examples, the feedback processing engine 240 may update the historical performance 265 with user input from the user device 215. In some examples, the feedback processing engine 240 may update the historical performance 265 with information received from the cloud server 220. In some implementations, the historical performance 265 may include a record of actual performance of objectives according to the objective definition data structure 260 associated with a historical configuration 265b generated by the PCG engine 235. For example, the model training engine 245 may apply the historical performance 265 to train the configuration generation model 250. Various training embodiments of the model training engine 245 may be described with reference to FIGS. 3-4.

As shown in an illustrative example in FIG. 2B, the objective definition data structure 260 includes a dwelling time 270. For example, the dwelling time 270 may include a minimum dwelling time requirement for generating the configuration profile. The objective definition data structure 260 includes an active ingredient usage 275. For example, the active ingredient usage 275 may include a minimum concentration requirement of the PCAI 155 to be mixed with the solvent from the solution reservoir 125. For example, the PCG engine 235 may generate the configuration profile with a parameter controlling a flow rate at the metering unit 145.

The objective definition data structure 260 includes a water usage 280. For example, the water usage 280 may include a maximum water usage from the solution reservoir 125 per area (e.g., less than 5 gallons for an area of the garden area 120). The objective definition data structure 260 includes an output pressure 285. For example, the output pressure 285 may include a user selected output pressure at the output orifice 195b based on the length of the foam delivery tube 90.

The objective definition data structure 260 includes an effectiveness 290 and a work duration 295. For example, the effectiveness 290 may include a duration between each pests control job. For example, the PCG engine 235 may increase the effectiveness 290 by increasing the concentration of the PCAI 155 and/or increasing the dwelling time 270 of the PCAI 155. For example, the work duration 295 may be a measurement of a time required for a job to be completed. For example, a higher output pressure and/or a lower dwell time may reduce the work duration 295.

Figure 3:
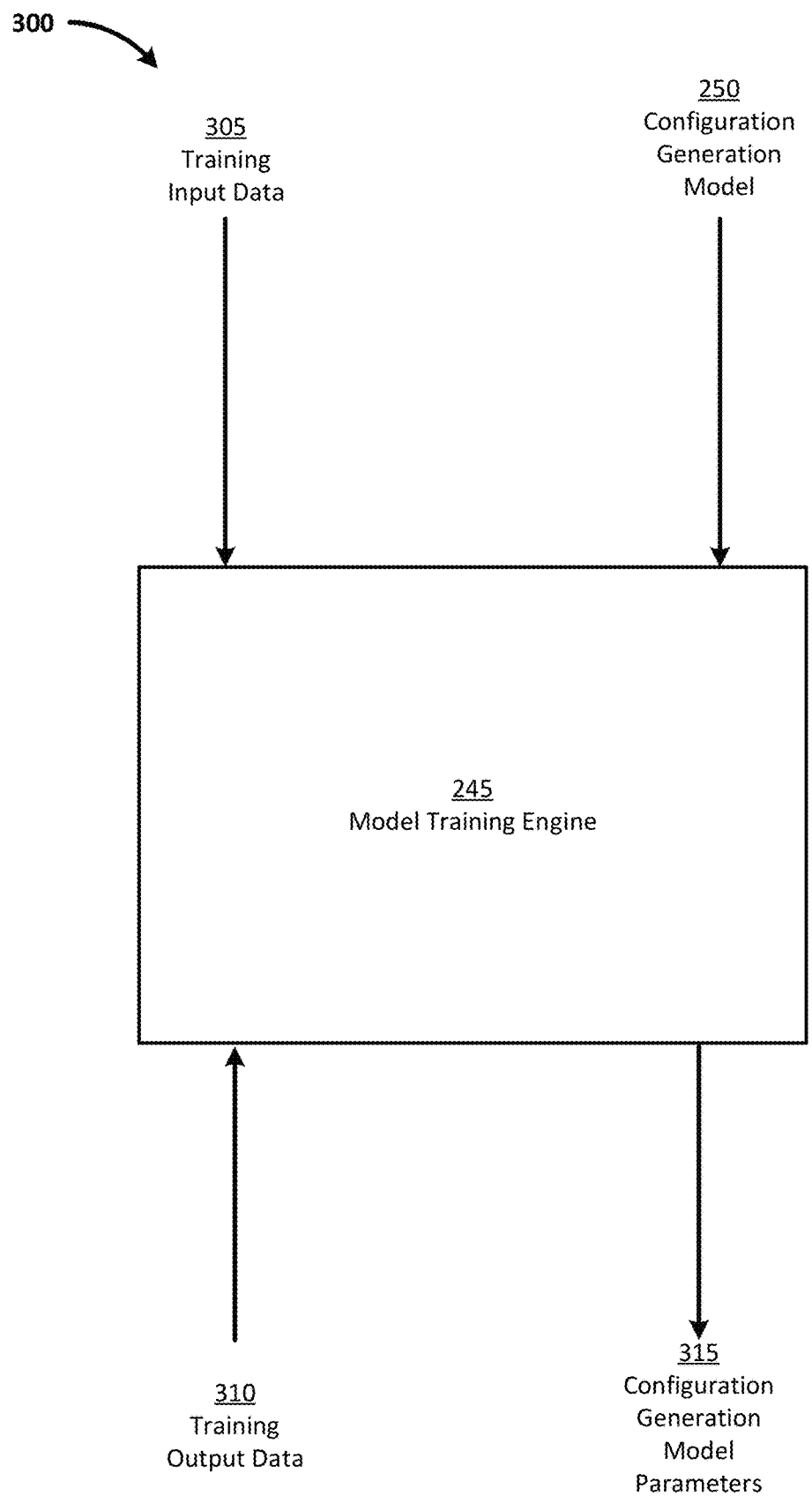
FIG. 3 depicts an exemplary model training engine for configuration parameters.

FIG. 3 depicts an exemplary model training engine for configuration parameters. In an exemplary scenario 300, the model training engine 245 includes a machine learning model. The machine learning model may, by way of example and not limitation, include a neural network model. The neural network model may include, for example, recurrent neural network (RNN) and/or deep neural network (DNN). The machine learning model may, for example, include an ensemble model. Different neural network models may be selected. The number of the model layers (e.g., the hidden neurons) may also be determined based on, for example, the complexity of content descriptions and/or attributes.

A set of training data is applied to the content characterization engine 235 to train the machine learning model. The training data includes a set of training input data 305 and a set of training output data 310. The set of training input data 305 may include the historical performance 265. The training input data 305 may include, for example, the objective definition data structure 260.

The set of training output data 310 may include the historical configuration 265b. The training output data 310 may, for example, be selected to correspond to the training input data 305. As an illustrative example, the historical performance 265 and the historical configuration 265b may be selected based on a job identification (e.g., of associated job performance and their corresponding performance). As an illustrative example, historical content attributes profiles and predetermined content attributes may be selected based on time (e.g., jobs performed at the same time).

In some embodiments, before training, a set of testing data (including testing input data and testing output data) may be divided from the training data. After the content characterization engine 235 is trained, the testing data may be applied to the trained model to test the training accuracy of the model. For example, the trained model may receive the testing input data and generate an output data in response to the testing input data. The generated output data may be compared with the testing output data to determine the prediction accuracy (e.g., based on a predetermined criterion(s) such as a maximum error threshold). In some embodiments, one or more models (e.g., neural network models) may be cascaded together. The cascaded model may be trained and tested.

During operation, a current configuration generation model 250 may be provided as inputs to the (trained) model training engine 245. The model training engine 245 may generate, in response, a corresponding configuration generation model parameters 315. For example, the corresponding configuration generation model parameters 315 may update the configuration generation model 250. In some embodiments, when a new configuration input is received from the user device 215, the PCG engine 235 may apply the configuration input to an updated configuration generation model 250 to generate the configuration profile.

Figure 4:
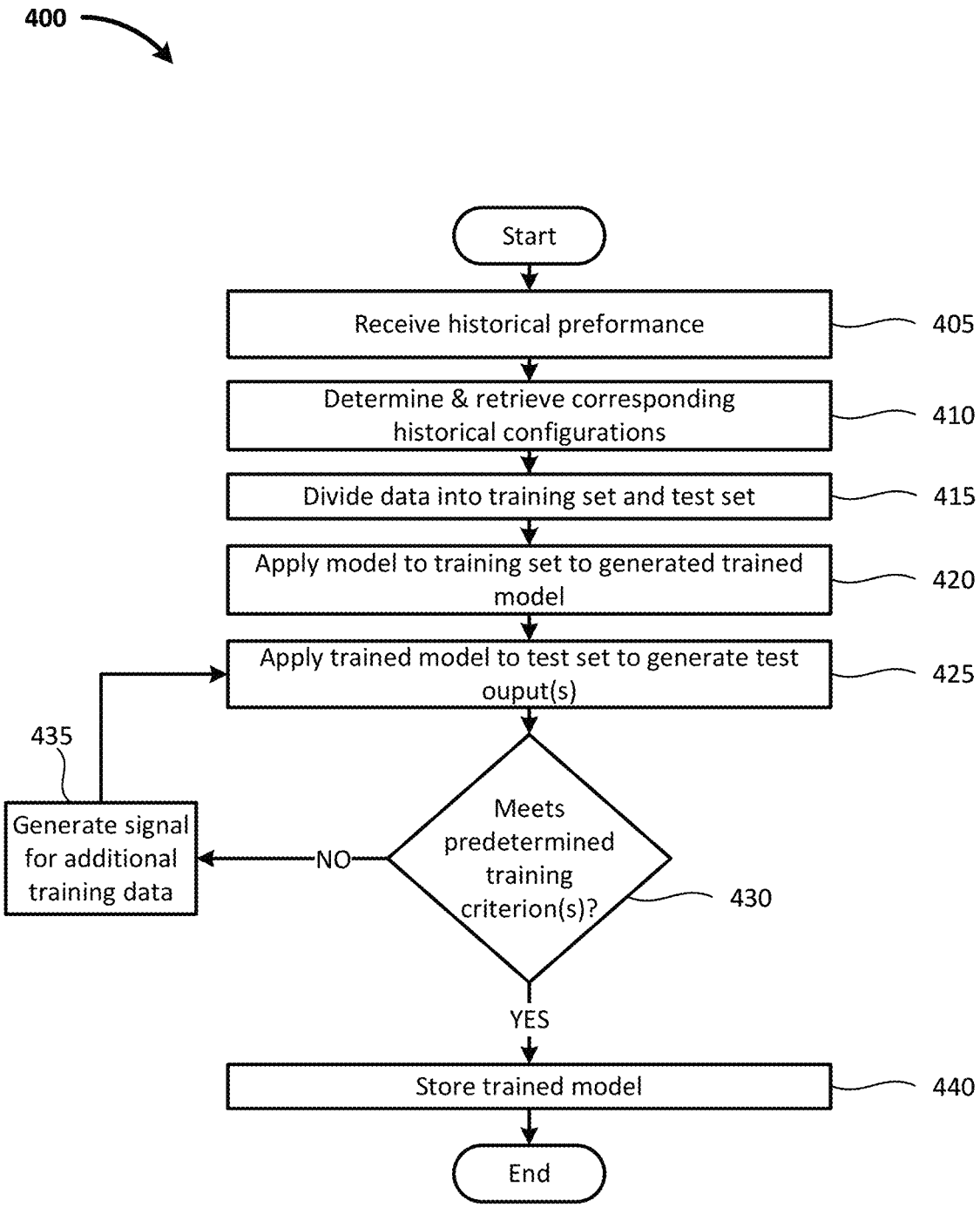
FIG. 4 depicts an exemplary method of training a model training engine.

FIG. 4 depicts an exemplary method of training a model training engine. A method 400 may, for example, be performed by a processor(s) (e.g., the processor 205) executing a program(s) of instructions retrieved from a data store(s) (e.g., the data store 255). The method 400 includes, at a step 405, receiving historical performance of a PCFGS (e.g., the historical performance 265). At a step 410, corresponding (historical) configurations (e.g., the historical configuration 265b and/or the configuration generation model 250) are determined and retrieved.

At a step 415, the retrieved data is divided into a first set of data used for training and a second set of data used for testing. At a step 420, a model (e.g., the configuration generation model 250) is applied to the training data to generate a trained model (e.g., neural network model). The trained model is applied to the testing data, in a step 425, to generate test output(s) (e.g., content attribute profile(s)). The output is evaluated, in a decision point 430, to determine whether the model is successfully trained (e.g., by comparison to a predetermined training criterion(s)). The predetermined training criterion(s) may, for example, be a maximum error threshold. For example, if a difference between the actual output (the test data) and the predicted output (the test output) is within a predetermined range, then the model may be regarded as successfully trained. If the difference is not within the predetermined range, then the model may be regarded as not successfully trained. At a step 435, the processor may generate a signal(s) requesting additional training data, and the method 400 loops back to step 425. If the model is determined, at the decision point 430, to be successfully trained, then the trained model may be stored (e.g., in the storage module 230 and/or the data store 255), in a step 440, and the method 400 ends.

Figure 5:
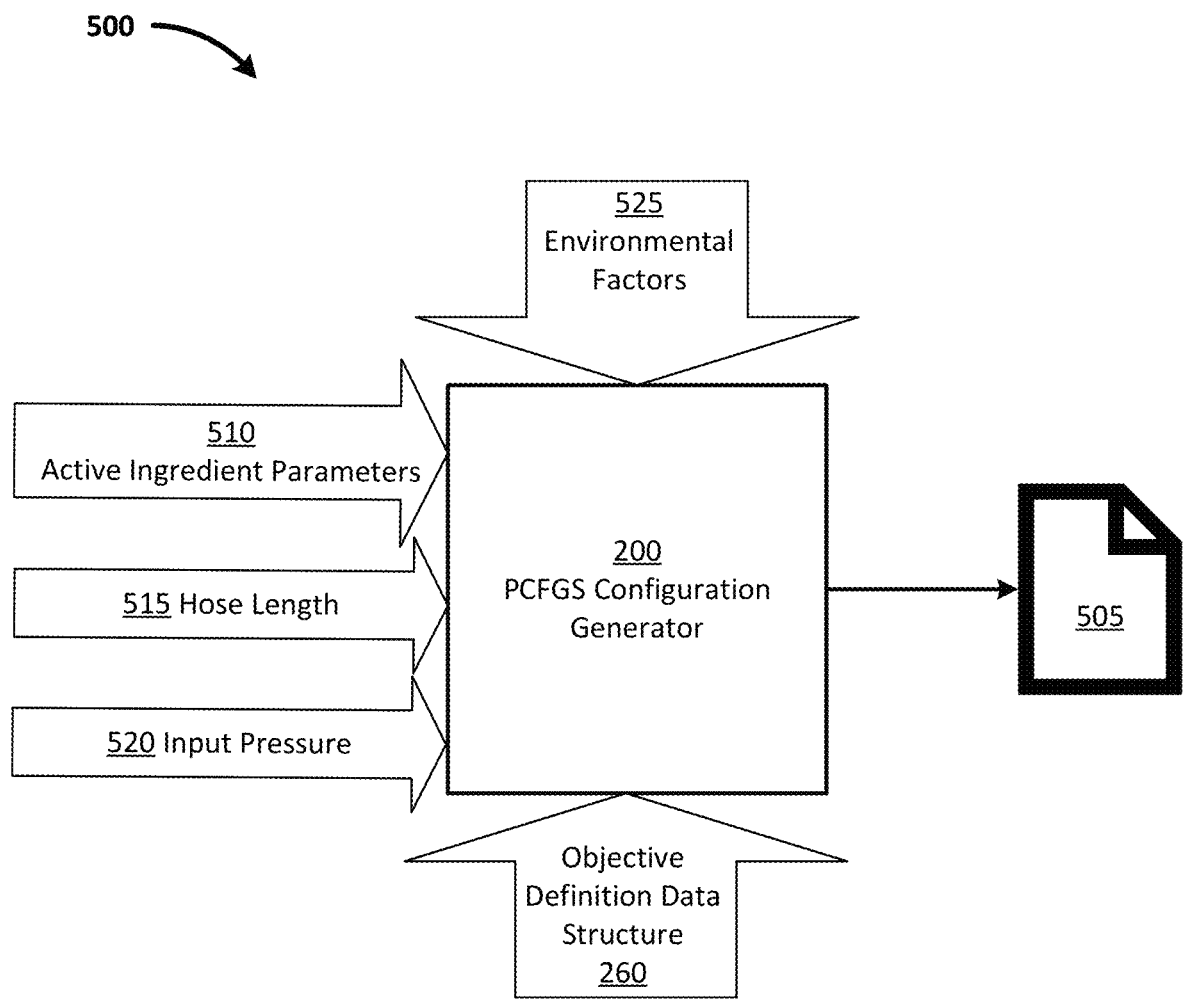
FIG. 5 is a block diagram depicting an exemplary process in generating a configuration profile for the PCFGS.

FIG. 5 is a block diagram depicting an exemplary process 500 in generating a configuration profile for the PCFGS. For example, the PCG 200 may receive input data from the user device 215 and/or the cloud server 220 via the communication module 210.

In this example, the PCG 200 may receive various inputs to generate a configuration profile 505. For example, the configuration profile 505 may be transmitted to the user device 215. For example, the user device 215 may include an application configured to display the configuration profile 505 on a user's screen.

In the depicted example, the PCG 200 generates the configuration profile 505 as a function of user inputs including active ingredient parameters 510, a hose length 515, and an input pressure 520. For example, the active ingredient parameters 510 may include a type of the pesticide to be used (e.g., in the PCAI 155). In some examples, some types of pesticide may include different performance parameters (e.g., acidity requirements, dilation requirements). For example, the hose length 515 may include a user input measurement of the foam delivery tube 190. For example, the user may select a longer hose when the house 115 is large. For example, the input pressure 520 may include a user selected pressure at the VSPDS 135.

The PCG 200 may generate the configuration profile 505 based on the objective definition data structure 260. For example, the PCG 200 may generate a recommended configuration based on whether it is an objective to have a longer lasting foam (e.g., for display). For example, the objective definition data structure 260 may include a cost saving object, a water usage objective, a safety objective, and/or other operation objectives. In some examples, the objective definition data structure 260 may be selected based on a job type and/or target pests.

The PCG 200 may generate the configuration profile 505 based on environmental factors 525. For example, the environmental factors 525 may be received from the cloud server 220. In some implementations, the environmental factors 525 may be received from user input. In some examples, the environmental factors 525 may include a geographic location of a job. For example, the PCG 200 may determine a local water acidity at the geographic location. For example, the PCG 200 may generate an amount of vinegar to be added to the solution reservoir 125 based on the active ingredient parameters 510 and the geographical location (e.g., to maintain a predetermined pH value of the solvent).

For example, the environmental factors 525 may include temperature information (e.g., a current temperature, a predicted temperature). For example, the PCG 200 may adjust the ratio of aperture openings of the input orifice 195a and the output orifice 195b based on the temperature information. In some embodiments, the environmental factors 525 may include a season information. For example, the PCG 200 may determine a foam is not needed when it is the Winter season. Various embodiments may advantageously improve an effectiveness and efficiency of the PCFGS 100.

Figure 6:
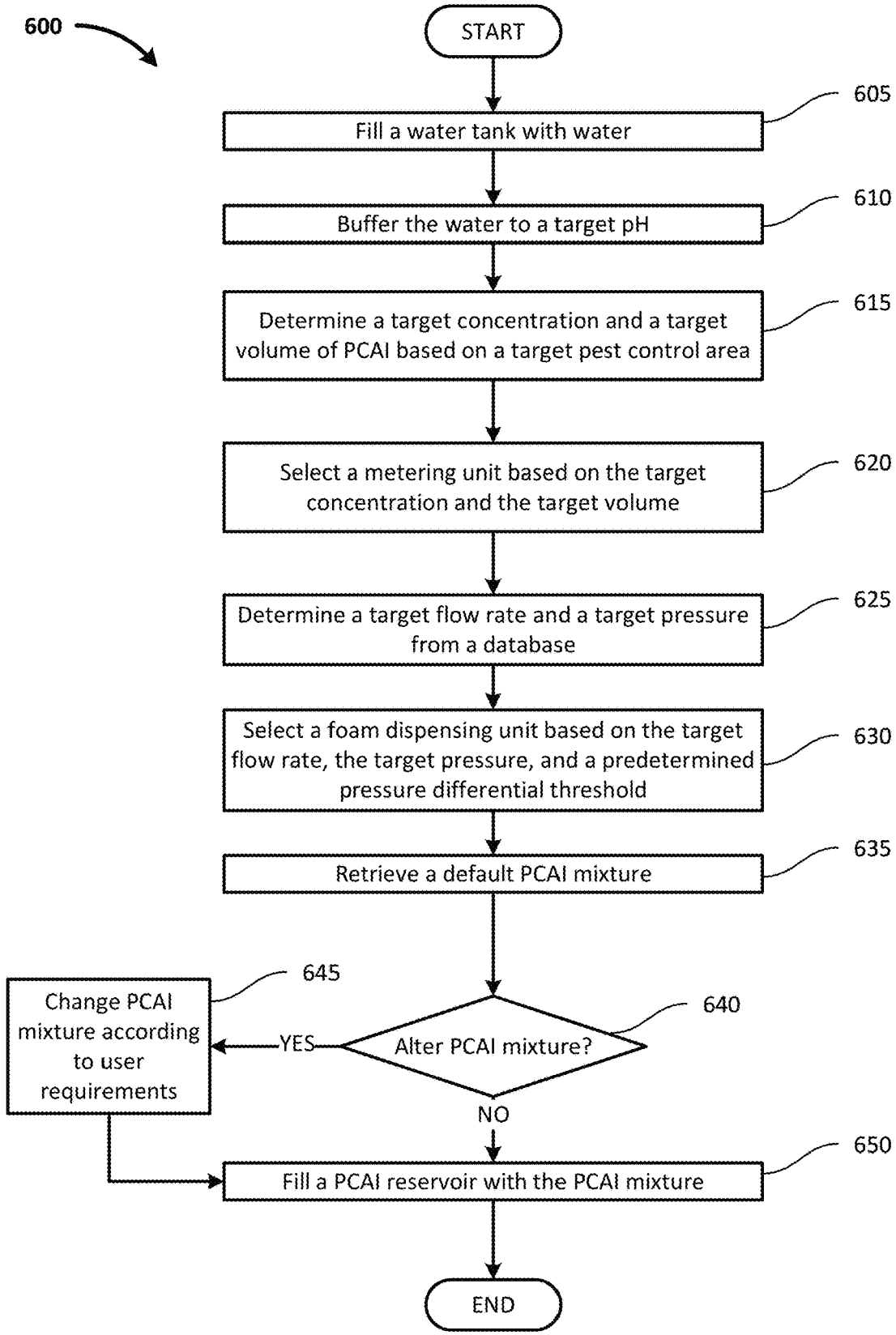
FIG. 6 is a flowchart illustrating an exemplary PCFGS configuration method.

FIG. 6 is a flowchart illustrating an exemplary PCFGS configuration method 600. For example, the exemplary PCFGS configuration method 600 may be performed by a user of the PCFGS 100 to prepare the PCFGS 100 for pest control action. For example, the exemplary PCFGS configuration method 600 may be performed by a computer having a processing unit to automatically calibrate the PCFGS 100 for pest control. In this example, the exemplary PCFGS configuration method 600 begins in step 605 when a water tank is filled with water. For example, the solution reservoir 125 may be filled with tap water.

Next, the water is buffered to a target pH value in step 610. For example, the water may be acidified to a target pH of 6-6.5. In step 615, a target concentration and a target volume of PCAI is determined based on a target pest control area. For example, the target concentration and the target volume may be determined as a function of the total area of the target pest control area. For example, the target concentration and the target volume may be determined based on local regulations.

After the target concentration and the target volume are determined, a metering unit is selected based on the target concentration and the target volume in step 620. Next, a target flow rate and a target pressure is retrieved from a database in step 625. For example, the target flow rate and the target pressure may be selected from a lookup table showing a relation between pest control effectiveness and, for example, a size of the pest control area, type of pest in the pest control area, and/or other factors.

In step 630, a foam dispensing unit is selected based on the target flow rate, the target pressure, and a predetermined pressure differential threshold. For example, the foaming dispensing tip 160 may be selected. For example, the foaming dispensing tip 160 may be selected to modify a flow rate of the VSPDS 135 based on a specification of the VSPDS 135 retrieved from an online database. For example, the predetermined pressure differential may determine when the fluid injection unit 140 may be activated to induce injection of the PCAI 155 from the PCAI reservoir 130.

In step 635, a default PCAI mixture is retrieved. For example, a gallon of the PCAI 155 (e.g., as described in FIG. 1B) may be retrieved. In a decision point 640, it is determined whether the PCAI mixture is to be altered. For example, a user may determine to alter the default PCAI based on local regulations, and/or to adapt to specifics of the target pest control area.

If it is determined that the PCAI mixture is to be altered, in step 645, the PCAI mixture is changed according to user requirements. For example, concentrations of the foaming agent 170, the active ingredient 175, the surfactant 180, and/or the cleaning agent 185 may be changed. For example, if the target pest control area has a very serious pest problem, the active ingredient 175 may be required to be increased. If it is determined that the PCAI mixture is to be altered, or after the step 645, a PCAI reservoir (e.g., the is filled with the PCAI mixture in step 650, and the method 600 ends.

Figure 7:
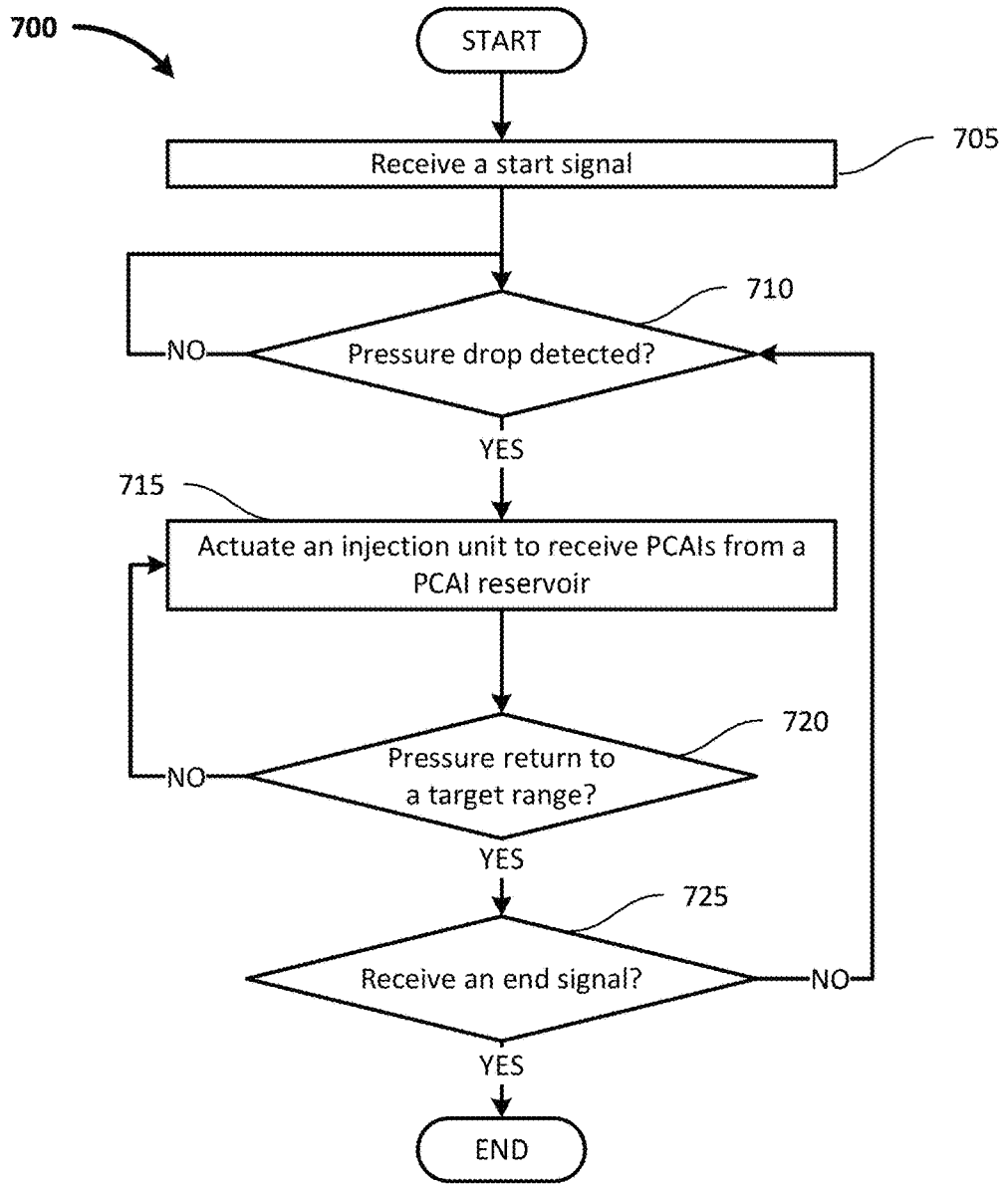
FIG. 7 is a flowchart illustrating an exemplary pest control foam generation method.

FIG. 7 is a flowchart illustrating an exemplary pest control foam generation method 700. For example, a controller of the PCFGS 100 may perform the exemplary pest control foam generation method 700. For example, the controller may be an operator. For example, the controller may be a computer device controlling various modules of the PCFGS 100. In this example, the exemplary pest control foam generation method 700 begins in step 705 when a start signal is received. For example, the VSPDS 135 may be switched on. Next, in a decision point 710, it is determined whether a pressure drop is detected. For example, the PSU 165 may sense a pressure drop at the fluid injection unit 140. If no pressure drop is detected, the exemplary pest control foam generation method 700 returns to the decision point 710.

If a pressure drop is detected, in step 715, an injection unit is actuated to receive PCAIs from a PCAI reservoir. For example, the metering unit 145 of the fluid injection unit 140 may be actuated to aspirate the PCAI 155 from the PCAI reservoir 130. In a decision point 720, it is determined whether the pressure returns to a target range. For example, the PSU 165 may determine that the pressure is returned to a predetermined target range depending on the selected foaming dispensing tip 160.

If the pressure has not returned to the target range, the step 715 is repeated. If the pressure has returned to the target range, in a decision point 725, it is determined whether an end signal is received. For example, the VSPDS 135 may be switched off. If the end signal is not received, the decision point 710 is repeated. If the end signal is received, the exemplary pest control foam generation method 700 ends.

Figure 8:
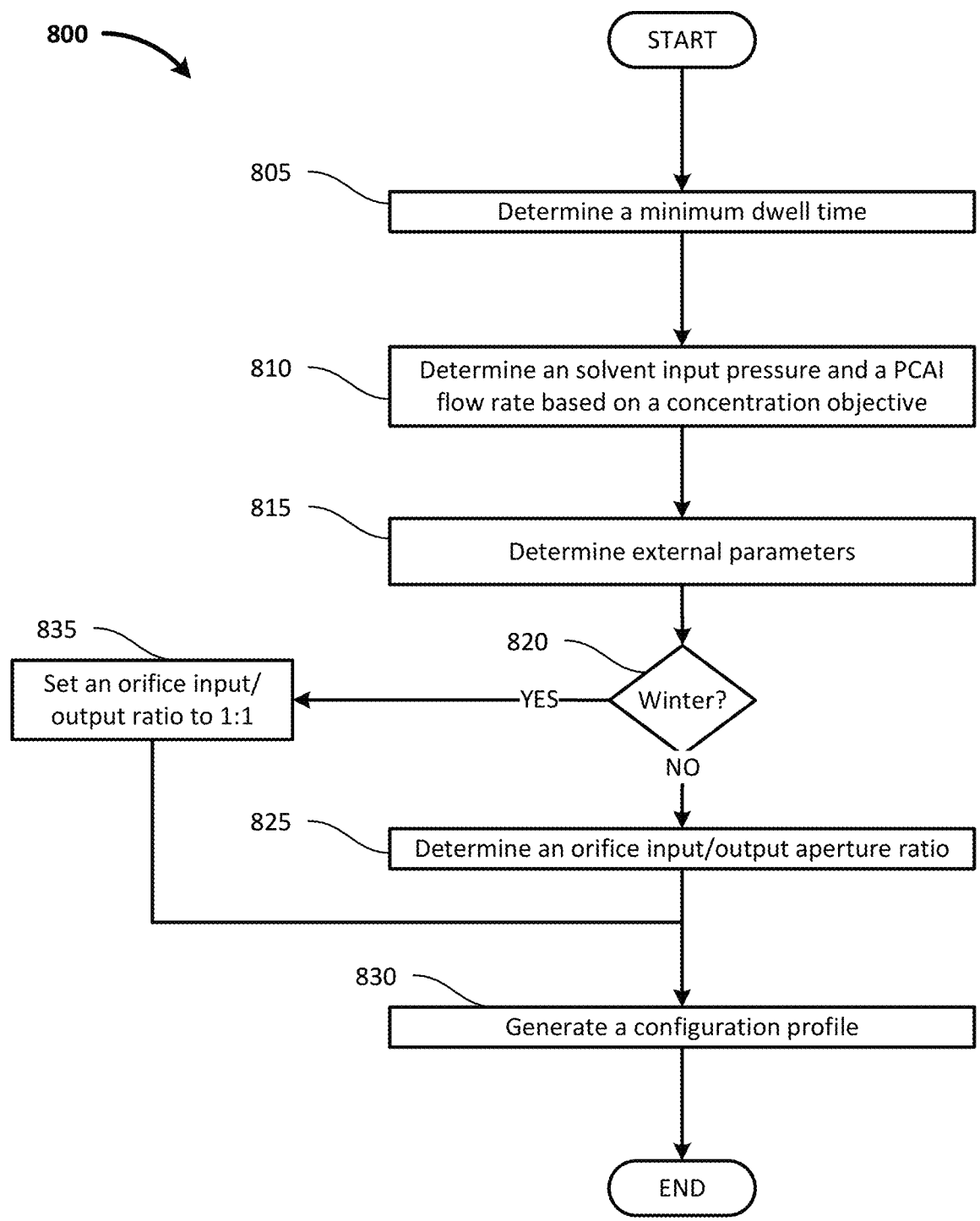
FIG. 8 is a flowchart illustrating an exemplary configuration recommendation generation method.

FIG. 8 is a flowchart illustrating an exemplary configuration recommendation generation method 800. For example, the method 800 may be performed by the PCG engine 235 after receiving user input from the user device 215 for generating the configuration profile 505. In this example, the method 800 begins in step 805 when a minimum dwell time is determined. For example, the PCG engine 235 may retrieve the objective definition data structure 260 to determine the minimum dwell time required for the pest control foam 110. For example, the PCG 200 may receive the minimum dwell time directly from the user via the user device 215.

In step 810, a solvent input pressure and a PCAI flow rate are determined based on a concentration objective. For example, the PCG engine 235 may generate an input pressure of the VSPDS 135 and a required flow rate of the PCAI 155 through the metering unit 145 based on the objective definition data structure 260.

External parameters are determined in step 815. For example, the PCG engine 235 may retrieve environmental data. For example, the environmental data may impact the foam's efficacy and stability. For example, the PCG engine 235 may access environmental data including seasonal information, temperature information, wind speed, rainfall prediction through the cloud server 220 to determine the current or expected season based on the geographic location of the pest control job. For example, the environmental factors 525 may be received from the user device 215. For example, the user input may include external hardware parameters. For example, the user input may include a hose length. For example, the user input may include a maximum and/or minimum output pressure of the VSPDS 135. For example, the user input may include a location of the pests control job. For example, the external parameters may include hardware parameters. For example, the hardware parameters may include a length of the foam delivery tube 190. For example, the external parameters may include a type of the active ingredient in the PCAI 155. For example, the external parameters may include a location of the job. For example, the external parameters may include a maximum and/or minimum pressure output of the VSPDS 135.

At a decision point 820, it is determined whether the season is winter. For example, the PCG engine 235 may evaluate data retrieved from environmental factors 525 to check whether the current season corresponds to winter conditions. For example, the PCG engine 235 may determine whether it is winter based on a location and a current date.

If the season is not winter, in step 825, an orifice input/output aperture ratio is determined. For example, the PCG engine 235 may determine an appropriate aperture ratio between the input orifice 195a and the output orifice 195b based on user input, the environmental parameters, the objective definition data structure 260, and the configuration generation model 250.

In step 830, a configuration profile is generated. For example, the PCG engine 235 may generate the configuration profile 505 as a function of the active ingredient parameters 510, the hose length 515, the input pressure 520, and the environmental factors 525.

At the decision point 820, if it is determined that it is winter, in step 835, an orifice input/output ratio is set to 1:1. For example, the PCG engine 235 may be configured to generate a foamless spray during the Winter season. For example, the PCG engine 235 may automatically configure the input orifice 195*a* and the output orifice 195*b* to have equal apertures to adjust for lower pest activity during winter months.

Although various embodiments have been described with reference to the figures, other embodiments are possible.

In some implementations, the PCFGS 100 may be installed in a building structure. For example, the PCFGS 100 may be fixedly installed at the house 115. For example, the PCFGS 100 may be activated by a timer to dispense the pest control foam 110 at targeted areas of the house 115. In some implementations, the PCFGS 100 may include a user interface (e.g., buttons, nubs, keypads, graphical user interface generated at a remotely connected computing device). For example, a user may use the user interface to input various properties of the pest control target (e.g., area, type of pest, features in the area).

Although various embodiments have been described with reference to the figures, other embodiments are possible. For example, the pest control foam 110 may include herbicides. For example, the pest control foam 110 may include cleaning (e.g., dirt removing, oil removing) foam.

Although an exemplary system has been described with reference to FIGS. 1A-C, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a topical pests control application system may include an active ingredient reservoir may include an active ingredient preselected based on an active ingredient selection model. For example, the topical pests control application system may include a solvent reservoir may include a solvent. For example, an acidity of the solvent may be regulated at a predetermined pH value. For example, the topical pests control application system may include a foam generation unit coupled to the active ingredient reservoir and the solvent reservoir.

For example, the foam generation unit may be configured to generate a pest controlling foam at a foam generating orifice. For example, the foam generation unit may include a variable speed power washer coupled to the solvent reservoir configured to supply a mixture of the active ingredient and the solvent at a predetermined input pressure to the foam generating orifice. For example, a concentration of the active ingredient in the mixture may be less than 0.005%.

For example, the foam generation unit may include a metering unit coupled to the active ingredient reservoir. For example, the metering unit may include a flow controlling orifice configured to control an input flow rate of the active ingredient from the active ingredient reservoir to the foam generation unit. For example, the foam generating orifice may include an input aperture and an output aperture. For example, the input aperture and the output aperture may be selected as a function of a length of a hose connected at a proximal end to the foam generating orifice, the active ingredient, the acidity, the input flow rate, and the predetermined input pressure to generate a predetermined pressure drop between the input aperture and the output aperture, and a predetermined output pressure at a distal end of the hose. For example, the length of the hose may be at least 100 feet, and the predetermined pressure drop may be determined such that an output pressure at the output aperture may be at least 900 psi. For example, the pest controlling foam may include a minimum dwell time of at least 5 minutes posterior to application on a surface.

For example, the active ingredient may include a foaming agent, a pest control agent, and a cleaning agent. The topical pests control application system may include a data store may include an application history associated to parameters. For example, the parameters may include an application location for topically applying the pest controlling foam. For example, the parameters may include an application time for applying the pest controlling foam. For example, the active ingredient selection model may include selecting a type of the active ingredient based on the application history.

For example, the predetermined pH value may be determined based on a type of the active ingredient and an application location for topically applying the pest controlling foam. For example, the predetermined output pressure may be between 60-150 psi. For example, the length of hose may be longer than 100 feet.

For example, the predetermined input pressure may be between 1400 psi and 1600 psi. For example, a ratio between the output aperture and the input aperture may be between 1.5 to 2.2.

In an illustrative aspect, a topical pests control application system may include an active ingredient reservoir may include an active ingredient preselected based on an active ingredient selection model. For example, the topical pests control application system may include a solvent reservoir may include a solvent. For example, an acidity of the solvent may be regulated at a predetermined pH value. For example, the topical pests control application system may include a foam generation unit coupled to the active ingredient reservoir and the solvent reservoir. For example, the solvent reservoir may be configured to generate a pest controlling foam at a foam generating orifice.

For example, the foam generation unit may include a variable speed power washer coupled to the solvent reservoir configured to supply a mixture of the active ingredient and the solvent at a predetermined input pressure to the foam generating orifice. For example, the foam generation unit may include a metering unit coupled to the active ingredient reservoir. For example, the metering unit may include a flow controlling orifice configured to control an input flow rate of input from the active ingredient reservoir to the foam generation unit.

For example, the foam generating orifice may include an input aperture and an output aperture. For example, the input aperture and the output aperture may be selected as a function of a length of a hose connected at a proximal end to the foam generating orifice, the active ingredient, the acidity, the input flow rate, and the predetermined input pressure to generate a predetermined pressure drop between the input aperture and the output aperture, and a predetermined output pressure at a distal end of the hose. For example, the pest controlling foam may include a minimum dwell time posterior to application on a surface.

For example, the active ingredient may include a foaming agent, a pest control agent, and a cleaning agent. The topical pests control application system include a data store including an application history associated to parameters. For example, the parameters may include an application location for topically applying the pest controlling foam. For example, the parameters may include an application time for applying the pest controlling foam. For example, the active ingredient selection model may include selecting a type of the active ingredient based on the application history.

For example, the predetermined pH value may be determined based on a type of the active ingredient and an application location for topically applying the pest controlling foam. For example, the solvent may include water and vinegar.

For example, the predetermined output pressure may be between 60-150 psi. For example, the length of the hose may be longer than 100 feet. For example, the flow controlling orifice may be selected as a function of the predetermined input pressure. For example, a concentration of the active ingredient in the mixture may be less than 0.005%.

For example, the predetermined pressure drop may be determined such that an output pressure at the output aperture may be at least 900 psi. For example, a ratio between the output aperture and the input aperture may be between 1.5 to 2.2. For example, the minimum dwell time may be at least 5 minutes.

In an illustrative aspect, a computer program product may include a program of instructions tangibly embodied on a non-transitory computer readable medium wherein, when the instructions may be executed on a processor, the processor causes automatic configuration generation operations to be performed to generate a set of configuration parameters for a location and time specific environmentally friendly and effective pest control foam. For example, the operations may include, in response to an activation signal received from a user device, determine a minimum dwell time of a pest control foam. For example, the operations may include determine a solvent input pressure from a variable speed power washer and a flow rate from a metering orifice. For example, the operations may include determine external parameters may include hardware parameters and environmental parameters. For example, the hardware parameters comprise a hose length. For example, the operations may include determine whether the pest control foam may be to be generated based on the external parameters.

For example, when the pest control foam may be to be generated, the operations may include determine an orifice input/output aperture ratio based on the external parameters, the minimum dwell time, the solvent input pressure, and the flow rate. For example, the operation may include generate a configuration profile may include the orifice input/output aperture ratio. For example, the pest control foam generated using the configuration profile may include a minimum dwell time of at least 5 minutes posterior to application on a surface.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A topical pests control application system comprising:
   an active ingredient reservoir comprising an active ingredient preselected based on an active ingredient selection model;
   a solvent reservoir comprising a solvent, wherein an acidity of the solvent is regulated at a predetermined pH value; and,
   a foam generation unit coupled to the active ingredient reservoir and the solvent reservoir, and configured to generate a pest controlling foam at a foam generating orifice, wherein the foam generation unit comprises:
   a variable speed pump coupled to the solvent reservoir configured to supply a mixture of the active ingredient and the solvent at a predetermined input pressure to the foam generating orifice, wherein a concentration of the active ingredient in the mixture is less than 0.005%; and,
a metering unit coupled to the active ingredient reservoir, wherein the metering unit comprises a flow controlling orifice configured to control an input flow rate of the active ingredient from the active ingredient reservoir to the foam generation unit, wherein:
the foam generating orifice comprises an input aperture and an output aperture; and,
the input aperture and the output aperture are selected as a function of a length of a hose connected at a proximal end to the foam generating orifice, the active ingredient, the acidity, the input flow rate, and the predetermined input pressure to generate a predetermined pressure drop between the input aperture and the output aperture, and a predetermined output pressure at a distal end of the hose, wherein the length of the hose is at least 100 feet, and the predetermined pressure drop is determined such that an output pressure at the output aperture is at least 900 psi, such that the pest controlling foam is generated with a minimum dwell time of at least 5 minutes posterior to application on a surface.

2. The topical pests control application system of claim 1, wherein the active ingredient comprises a foaming agent, a pest control agent, and a cleaning agent.

3. The topical pests control application system of claim 1, further comprises a data store comprising an application history associated to external parameters comprising:
an application location for topically applying the pest controlling foam; and,
an application time for applying the pest controlling foam, wherein the active ingredient selection model comprises selecting a type of the active ingredient based on the application history.

4. The topical pests control application system of claim 1, wherein the predetermined pH value is determined based on a type of the active ingredient and an application location for topically applying the pest controlling foam.

5. The topical pests control application system of claim 1, wherein the predetermined output pressure is between 60-150 psi.

6. The topical pests control application system of claim 1, wherein the length of hose is longer than 100 feet.

7. The topical pests control application system of claim 6, wherein the predetermined input pressure is between 1400 psi and 1600 psi.

8. The topical pests control application system of claim 7, wherein a ratio between the output aperture and the input aperture is between 1.5 to 2.2.

9. A topical pest control application system comprising:
an active ingredient reservoir comprising an active ingredient preselected based on an active ingredient selection model;
a solvent reservoir comprising a solvent, wherein an acidity of the solvent is regulated at a predetermined pH value; and,
a foam generation unit coupled to the active ingredient reservoir and the solvent reservoir, and configured to generate a pest controlling foam at a foam generating orifice, wherein the foam generation unit comprises:
a variable speed pump coupled to the solvent reservoir configured to supply a mixture of the active ingredient and the solvent at a predetermined input pressure to the foam generating orifice; and,
a metering unit coupled to the active ingredient reservoir, wherein the metering unit comprises a flow controlling orifice configured to control an input flow rate of input from the active ingredient reservoir to the foam generation unit, wherein:
the foam generating orifice comprises an input aperture and an output aperture; and,
the input aperture and the output aperture are selected as a function of a length of a hose connected at a proximal end to the foam generating orifice, the active ingredient, the acidity, the input flow rate, and the predetermined input pressure to generate a predetermined pressure drop between the input aperture and the output aperture, and a predetermined output pressure at a distal end of the hose, such that the pest controlling foam is generated with a minimum dwell time posterior to application on a surface.

10. The topical pests control application system of claim 9, wherein the active ingredient comprises a foaming agent, a pest control agent, and a cleaning agent.

11. The topical pests control application system of claim 9, further comprises a data store comprising an application history associated to external parameters comprising:
an application location for topically applying the pest controlling foam; and,
an application time for applying the pest controlling foam, wherein the active ingredient selection model comprises selecting a type of the active ingredient based on the application history.

12. The topical pests control application system of claim 9, wherein the predetermined pH value is determined based on a type of the active ingredient and an application location for topically applying the pest controlling foam.

13. The topical pests control application system of claim 9, wherein the solvent comprises water and vinegar.

14. The topical pests control application system of claim 9, wherein the predetermined output pressure is between 60-150 psi.

15. The topical pests control application system of claim 9, wherein the length of the hose is longer than 100 feet.

16. The topical pests control application system of claim 15, wherein the flow controlling orifice is selected as a function of the predetermined input pressure, such that a concentration of the active ingredient in the mixture is less than 0.005%.

17. The topical pests control application system of claim 15, wherein the predetermined pressure drop is determined such that an output pressure at the output aperture is at least 900 psi.

18. The topical pests control application system of claim 15, wherein a ratio between the output aperture and the input aperture is between 1.5 to 2.2.

19. The topical pests control application system of claim 9, wherein the minimum dwell time is at least 5 minutes.

20. A computer program product comprising a program of instructions tangibly embodied on a non-transitory computer readable medium wherein, when the instructions are executed on a processor, the processor causes automatic configuration generation operations to be performed to generate a set of configuration parameters for a location and time specific environmentally friendly and effective pest control foam, the operations comprising:

in response to an activation signal received from a user device, determine a minimum dwell time of a pest control foam;
determine a solvent input pressure from a variable speed pump and a flow rate from a metering orifice;
determine external parameters comprising hardware parameters and environmental parameters, wherein the hardware parameters comprise a hose length;
determine whether the pest control foam is to be generated based on the external parameters; and,
when the pest control foam is to be generated,
  determine an orifice input/output aperture ratio based on the external parameters, the minimum dwell time, the solvent input pressure, and the flow rate, and,
  generate a configuration profile comprises the orifice input/output aperture ratio, such that the pest control foam generated using the configuration profile comprises a minimum dwell time of at least 5 minutes posterior to application on a surface.

* * * * *